United States Patent [19]

Itoya

[11] 3,972,547
[45] Aug. 3, 1976

[54] LOCKING AND NONSEAL JOINT DEVICE

[75] Inventor: Kunio Itoya, Tokyo, Japan

[73] Assignee: Zenzo Ono, Tokyo, Japan

[22] Filed: Nov. 21, 1974

[21] Appl. No.: 525,765

[52] U.S. Cl. ............................ 285/341; 285/158; 285/382.7
[51] Int. Cl.² ........................................ F16L 19/06
[58] Field of Search ........... 285/341, 158, 342, 343, 285/382.7, 249; 151/7

[56] References Cited

UNITED STATES PATENTS

| | | | |
|---|---|---|---|
| 1,518,778 | 12/1924 | Eastman | 285/341 X |
| 2,139,413 | 12/1938 | Kreidel | 285/341 |
| 2,452,275 | 10/1948 | Wooding | 285/341 |
| 2,460,741 | 2/1949 | Friedman | 285/341 |
| 2,497,273 | 2/1950 | Richardson | 285/342 X |
| 2,547,394 | 4/1951 | Hynes et al. | 285/341 |
| 2,857,176 | 10/1958 | McTaggart et al. | 285/382.7 X |
| 3,004,574 | 10/1961 | Flick et al. | 151/7 |
| 3,218,096 | 11/1965 | Press | 285/341 X |
| 3,273,919 | 9/1966 | Billeter et al. | 285/341 X |
| 3,471,181 | 10/1969 | Fuentes | 285/382.7 X |
| 3,797,547 | 3/1974 | Shinjo | 151/7 |

FOREIGN PATENTS OR APPLICATIONS 1,912,337  10/1970  Germany ....................... 285/341

*Primary Examiner*—Thomas F. Callaghan

[57] ABSTRACT

A locking and nonseal pipe joint device which is comprised of a flanged holder having an external thread and adapted at its one end to be secured to a base body and at its opposite end to hold an end of the pipe, an intermediate packing member for sealing and locking the joint and a locking member having an internal thread and adapted to be screwed onto the flanged body through the intermediate packing member. The intermediate packing member is compressed against a circumference of the pipe in accordance with the screwing operation of the locking member.

5 Claims, 25 Drawing Figures

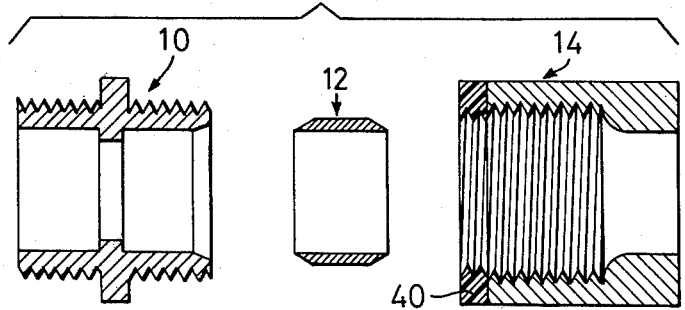
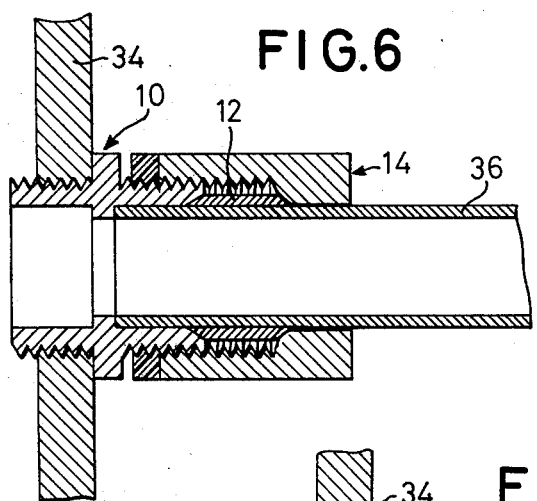
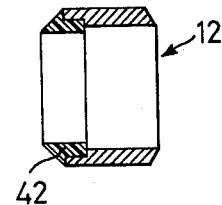
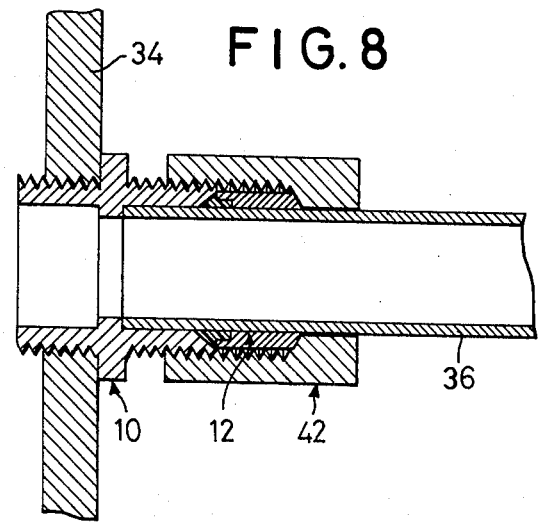

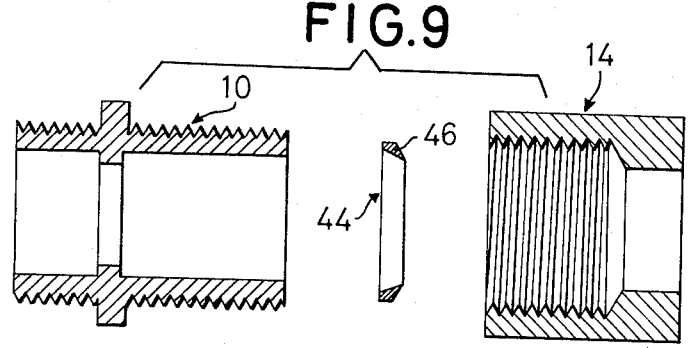
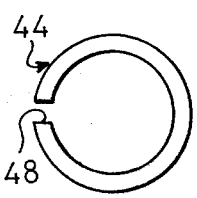
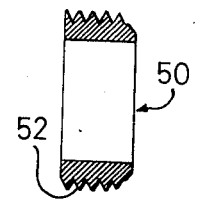
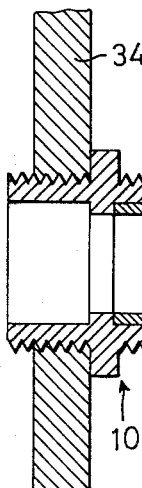
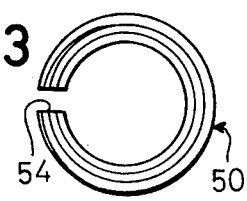
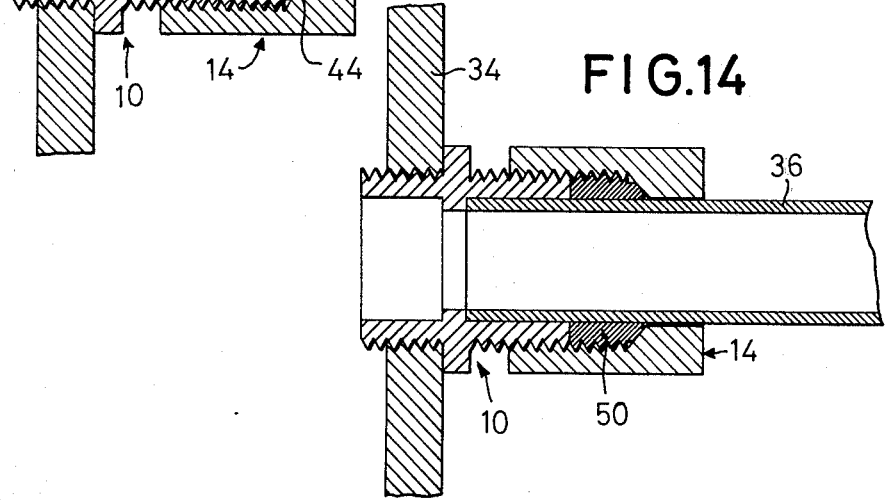

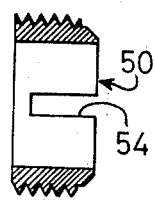
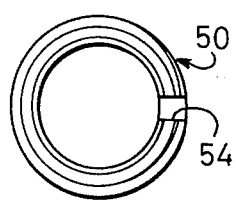
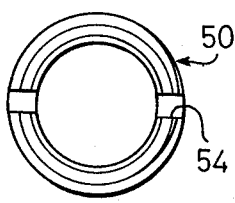
FIG.15   FIG.16a   FIG.16b
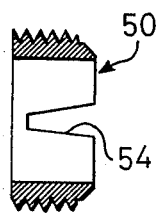
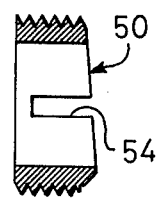
FIG.17   FIG.18
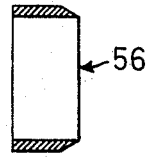
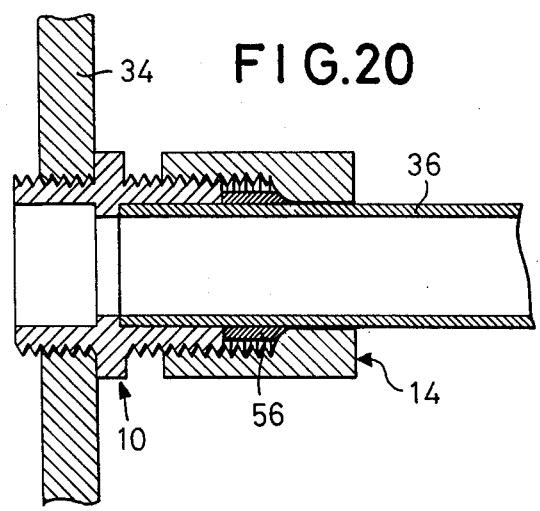
FIG.19   FIG.20

LOCKING AND NONSEAL JOINT DEVICE

BACKGROUND AND SUMMARY OF THE INVENTION

This invention relates to a locking and nonseal pipe joint device for use in the hydroulic arrangements.

Heretofore, various kinds of joints or couplings have been used in the hydroulic arrangements. In the conventional joints, it is inconvenient or troublesome to obtain sufficient sealing and locking effects.

It is, therefore, a general object of the invention to provide an improved joint which brings complete sealing and locking effects.

In accordance with the present invention, an improved joint is comprised of a flanged holder having an external thread and engageable with a base body at its one end adapted to hold an end of the pipe at its opposite end, an intermediate packing member for sealing and locking the joint and a locking member having a internal thread and adapted to be screwed onto the flanged body through the intermediate packing member. The intermediate packing member is compressed against the circumference of the pipe in accordance with the screwing operation of the locking member so that the joined portion is sufficiently sealed with a complete locking effect. The flanged holder formed into a tube and is internally provided with an annular projection for receiving an end of the pipe and an entrance of the holder may be inwardly recessed to form an inclination in section.

The intermediate packing member is also formed into a tube or a ring and typically has a substantially trapezoidal circumference in section. The intermediate packing member at its one end may be outwardly recessed to form an inclination in section. Further, the intermediate packing member at its circumference may be provided with an external thread adapted to co-act with an internal thread provided in the locking member as hereinafter described. In another embodiment of the invention, the intermediate packing member may be divided into one or more pieces of different materials. The intermediate packing member may have a wedge-shaped circumference in section having at its one open end a larger diameter than an outer diameter of the pipe and at its opposite end a substantially same diameter as the outer diameter of the pipe. Further, the intermediate packing member may be provided with one or more splits for smooth insertion of the packing member onto the flanged member.

The locking member is generally comprised of a substantially cylindrical block having two different diameters including a substantially same diameter as an outer diameter of the pipe and a larger diameter than the latter and a larger diameter portion is internally threaded and communicated with a small diameter portion through an annularly inclined portion. The locking member at its one end may be attached with a resilient ring having somewhat smaller inner diameter than an outer diameter of the flanged holder. The flanged holder, the intermediate packing member and the locking member may be formed of metal or hard plastic material.

Other objects and advantages will become apparent from consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

BRIEF DESCRIPTION OF THE DRAWINGS

FIG. 5 is a sectional view in disassembled relation of the pipe joint device of a further embodiment;

FIG. 6 is a sectional view in assembled relation of the pipe joint device of FIG. 5;

FIG. 7 is a sectional view of the packing member of another embodiment;

FIG. 8 is a sectional view in assembled relation of the pipe joint device using the packing member of FIG. 7;

FIG. 9 is a sectional view in assembled relation of the pipe joint device of a still further embodiment;

FIG. 10 is a lateral view of the packing member of FIG. 9;

FIG. 11 is a sectional view of the pipe joint device in assembled relation of FIGS. 9 and 10;

FIG. 12 is a sectional view of the packing member of a further embodiment;

FIG. 13 is a lateral view of the packing member of FIG. 12;

FIG. 14 is a sectional view of the pipe joint device of FIGS. 12 and 13;

FIG. 15 is a sectional view of the packing member of another embodiment;

FIG. 16a is a lateral view of the packing member of FIG. 15 where a single split is provided;

FIG. 16b is a lateral view of the packing member of FIG. 15 where two splits are symmetrically provided;

FIG. 17 is a sectional view of the packing member of a still further embodiment;

FIG. 18 is a sectional view of the packing member of another embodiment;

FIG. 19 is a sectional view of the packing member of a yet further embodiment;

FIG. 20 is a sectional view of the pipe joint device using the packing member of FIG. 19;

FIG. 22 is a sectional view of the pipe joint device in assembled relation using the packing member of FIG. 21a.

DESCRIPTION OF THE PREFERRED EMBODIMENT

Figure 1:
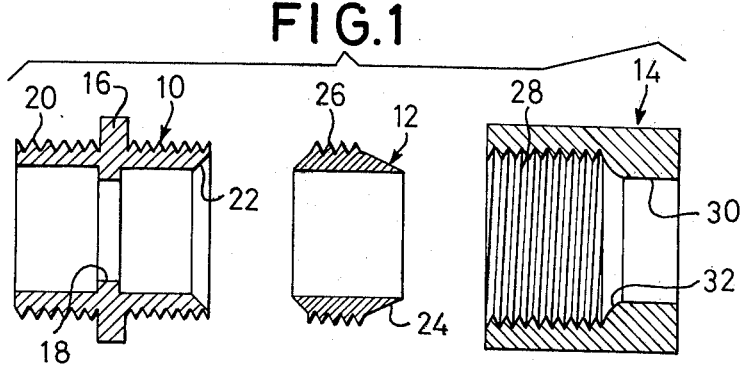
FIG. 1 is sectional view in disassembled relation of the pipe joint device in accordance with the invention.

In FIG. 1, the pipe joint device in accordance with the present invention is comprised of a holder 10, an intermediate packing member 12 and a locking member 14. The holder 10 is formed into a tube with an external flange 16 and an internal flange 18 for receiving an end of the pipe intended to be connected. The holder 10 is externally provided with a thread 20. An entrance edge of the holder is inwardly recessed to form an inclined portion 22. The intermediate packing member 12 is formed into a collar which has a substantially trapezoidal circumference 24 in section with an external thread 26.

The locking member 14 is formed into a cylindrical block with a hole 28 of larger diameter than the diameter of the packing member 12 and a hole 30 of the same inner diameter as that of the packing member 12. The hole 28 is communicated with the hole 30 through an annularly inclined portion 32.

Figure 2:
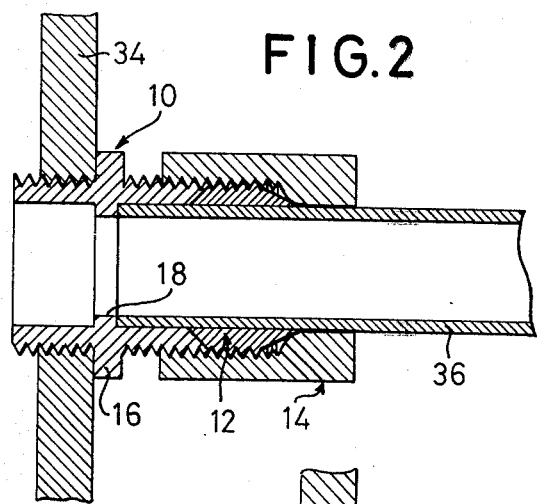
FIG. 2 is a sectional view in assembled relation of the pipe joint device of FIG. 1.

In FIG. 2, the holder 10 is screwed into the base body 34 until one side face of the external flange 16 is faced with the wall of the base body 34. The locking member 14 and the intermediate packing member are mounted on the pipe 36 and then the pipe 36 is inserted into the holder 10 until an end of the pipe 36 is received by the internal flange 18. Thereafter, the locking member 14 is screwed onto the holder 10 and the packing member 12 under pressure so that the inclined portions of the packing member 12 are pressed by the inclined portion 22 of the holder 10 and the annularly inclined portion 32 of the locking member 14 whereby the stress is exerted against the circumference of the pipe 36.

Figure 3:
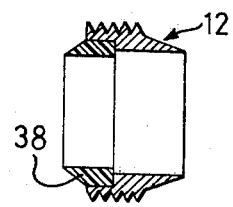
FIG. 3 is a sectional view of the packing member of another embodiment.
Figure 4:
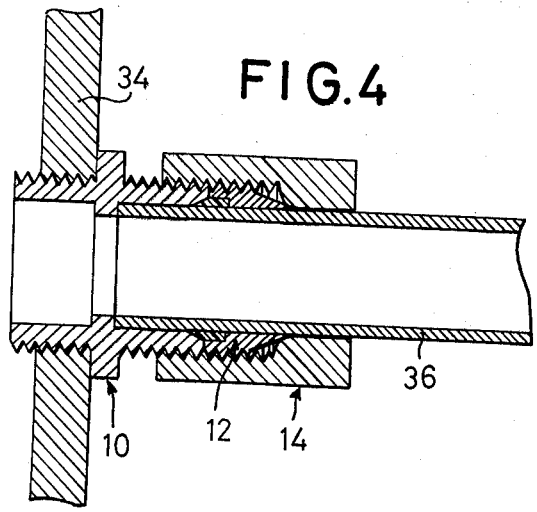
FIG. 4 is a sectional view in assembled relation of the pipe joint device using the packing member of FIG. 3.

In the embodiment shown in FIGS. 3 and 4, a ring 38 of elastic material is fitted to the intermediate packing member 12. The ring 38 has a smaller diameter than the diameter of the packing member 12 so that the ring 38 of elastic material is tightly mounted on the circumference of the pipe 36 when the packing member is mounted on the pipe 36.

In the other embodiment as shown in FIGS. 5 and 6, the locking member 14 at its one end is fitted with a ring 40 of elastic material which has a smaller diameter than that of the locking member 14 so that a complete sealing effect is obtained when the locking member 14 is screwed onto the holder 10 and the packing member 12 as best shown in FIG. 6.

The packing member as illustrated in FIG. 7 has a substantially same structure as that shown in FIGS. 3 and 4 except the ring 42 of elastic material having a sagittal form in section.

In FIGS. 9 to 11, the packing member 12 is formed into a ring 44 which has a wedge-shaped circumference in section 46 with a split 48. The ring 44 has at its one open end a larger diameter than an outer diameter of the pipe and at its opposite end a substantially same diameter as the outer diameter of the pipe. When the locking member 14 is screwed onto the holder 10, an inclined portion of the ring 44 is pressed by the annularly inclined portion 32 of the locking member 14 so that an edge of the ring 44 is entered into the circumference of the pipe 36 as best shown in FIG. 11.

In the embodiment as illustrated in FIGS. 12 to 14, the packing collar 50 is provided with an external thread 52 with a split 54.

In FIGS. 50 to 18, the packing collar 15 is provided with one or more partial splits of the same or different shapes and sizes.

Figure 21A:
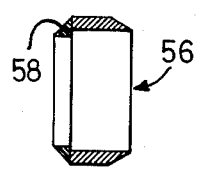
FIGS. 21a, b and c are sectional views of the packing members of another embodiments.
Figure 21B:
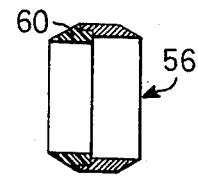
Figure 21C:
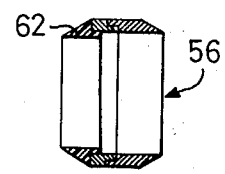
Figure 22:
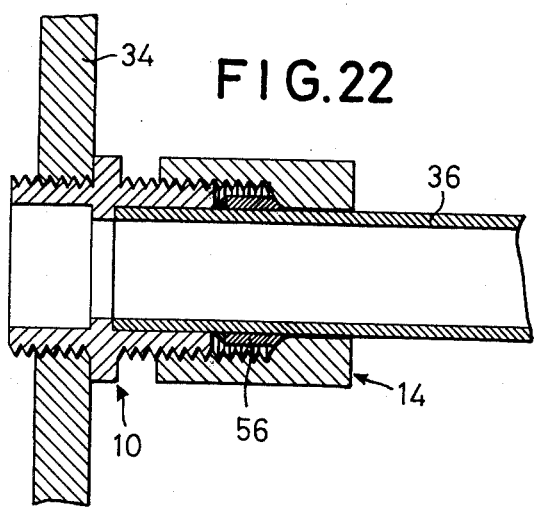

In FIGS. 19 and 20, the packing collar 56 does not have an external thread. The collar packings as illustrated in FIGS. 21 and 22 are similar to the collar packing 56 of FIG. 19 except an elastic attachment 58, 60 and 62 of elastic material.

What I claim is:

1. A conduit coupling device comprising in combination: a conduit-supporting member having first and second externally threaded portions and a laterally extending flange therebetween protruding therebeyond, said member having a central aperture dimensioned to receive and support a conduit, said member having an inwardly directed internal shoulder adapted to limit the extent of insertion into said member of said conduit and an inclined radial shoulder extending to said central aperture; an intermediate packing member having a central aperture extending therethrough of substantially the same diameter as said central aperture of said conduit-supporting member, said packing member having on at least a portion of its outer circumference threads of substantially the same diameter and pitch as the threads on at least one of said threaded portions of said conduit-supporting member, both ends of said packing member having an inclined surface, a first of said inclined surfaces being complementary to and adapted to coact with the inclined radial shoulder of said conduit-supporting member upon assembly of the device; and a locking member having a first section provided with a central through aperture of substantially the same diameter as that of the central aperture of said conduit-supporting member and said packing member and a second section threaded internally with a thread diameter and pitch adapted to cooperate with the threads of said packing member and the threads on said one portion of said conduit-supporting member, said first and second sections of said locking member being connected internally by an inclined surface extending between said internal thread and said central aperture; which is engageable upon assembly with said packing member and conduit-supporting member with the other of said inclined surfaces of said packing member; said locking member, packing member and conduit-supporting members being positionable such that with their central apertures in alignment said locking member is threadable onto both of said conduit-supporting and packing members so as to impart longitudinal and inwardly directed radial forces on said packing member at both ends thereof whereby substantially the entire internal surface of said packing member engges the external surface of the conduit to thereby lock said conduit against longitudinal movement and simultaneously seal the joint formed between said conduit and coupling against leakage of fluid from said conduit.

2. A conduit coupling device as claimed in claim 1, wherein said intermediate packing member has a substantially trapezoidal longitudinal cross-section.

3. A conduit coupling device as claimed in claim 1, wherein said intermediate packing member is formed as at least two separate sections of different materials and assembled as a unitary member.

4. A conduit coupling device as claimed in claim 1, wherein said intermediate packing member is provided with at least one longitudinally-extending slots.

5. A conduit coupling device as claimed in claim 1, wherein said intermediate packing member is formed of a compressible material.